May 26, 1936.   J. V. POOLE   2,042,275
INNERSOLE MAKING MACHINE
Filed Oct. 5, 1934   2 Sheets-Sheet 1
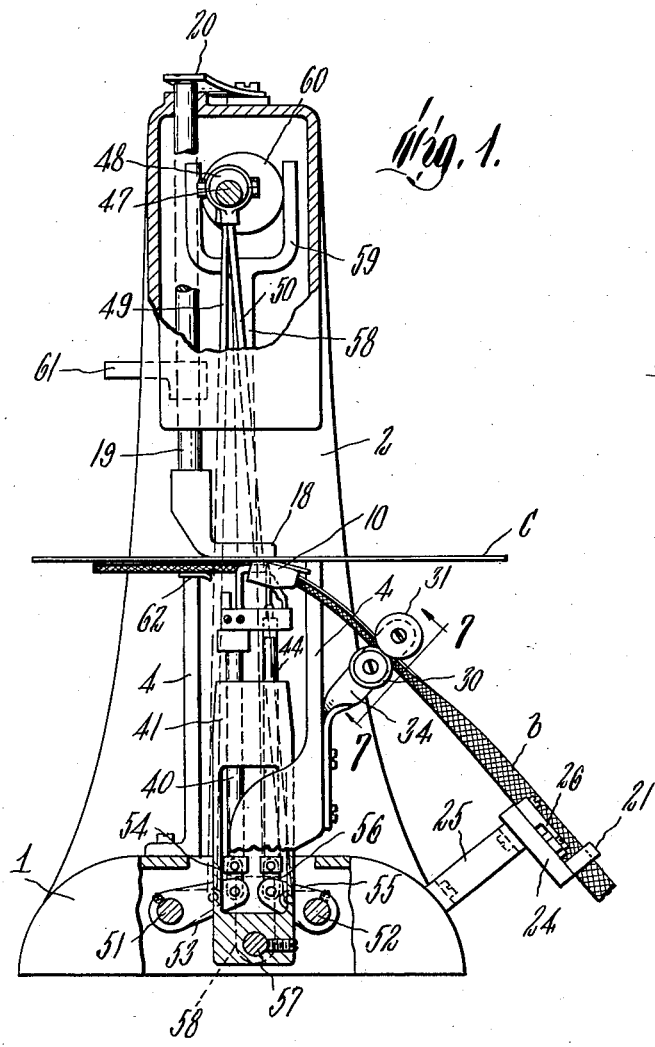
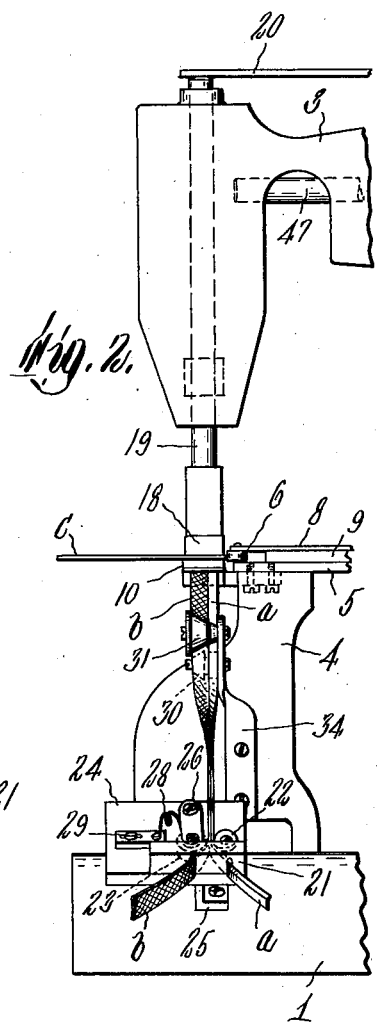
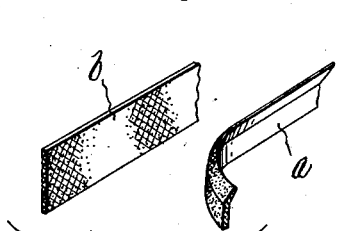
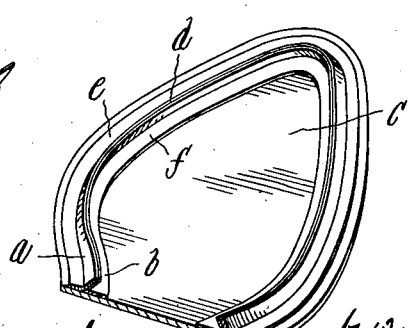
Inventor
Jesse V. Poole

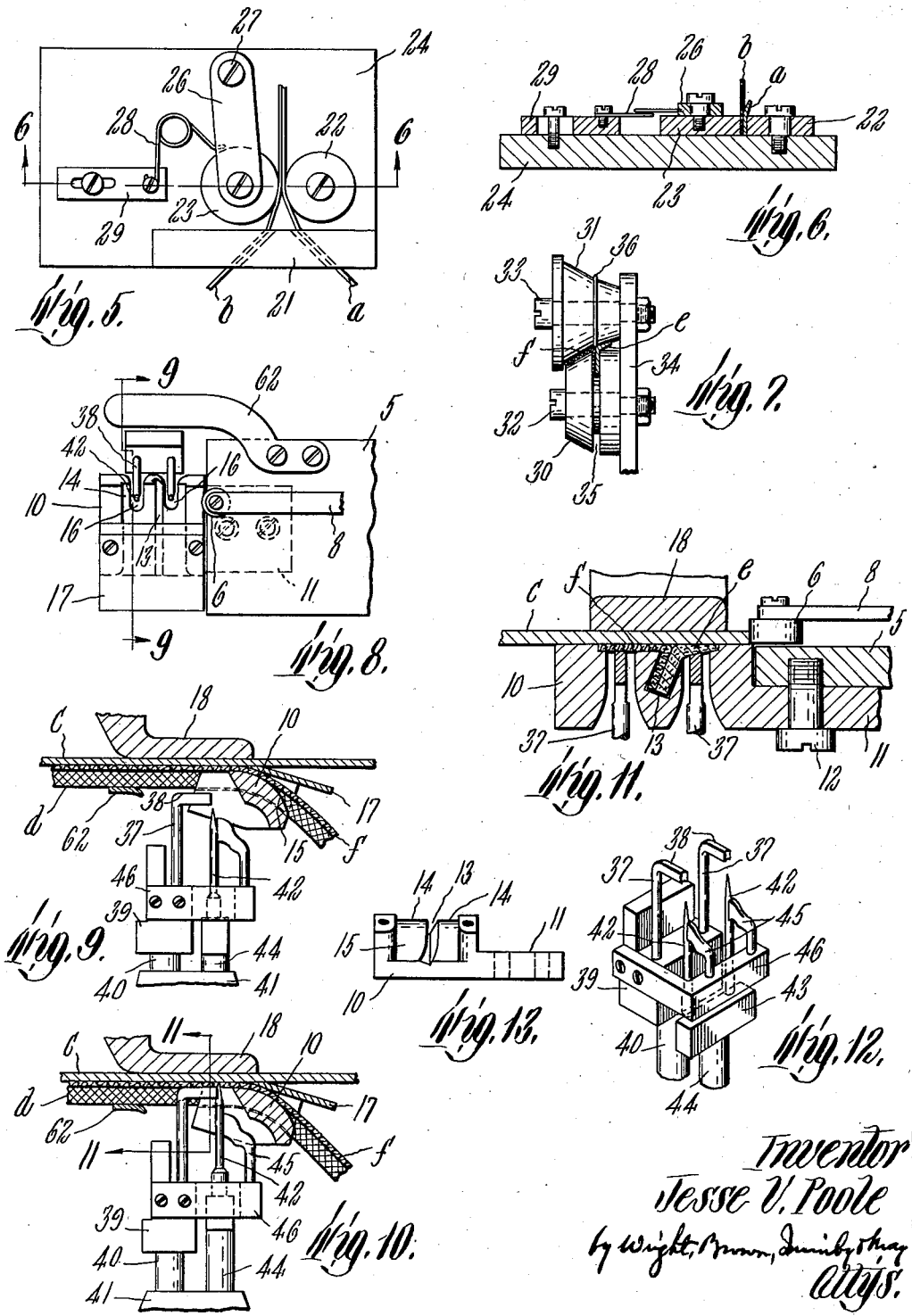

Patented May 26, 1936

2,042,275

UNITED STATES PATENT OFFICE 2,042,275

INNERSOLE MAKING MACHINE

Jesse V. Poole, Abington, Mass., assignor to Puritan Manufacturing Company, Boston, Mass., a corporation of Massachusetts Application October 5, 1934, Serial No. 747,000

15 Claims. (Cl. 12—20)

The subject of the present invention is a machine for producing innersoles suitable for use in the manufacture of welt shoes, by applying, and uniting by adhesion, strip material to an innersole body in such manner as to form a rib suitable for receiving and holding the inseam of the shoe. The machine comprises means for guiding the innersole body and strip material into contact with one another, means for feeding the adjoined body and strip forward, and means for pressing the contacting portions of the body and strip material firmly together so as to effect adherent union. The invention consists in such a machine and its novel characteristics, in principle and in detail; not only the specific embodiment thereof shown in the drawings for illustration; but also all substantial equivalents of the specific illustration.

In the drawings,—

Fig. 1 is a front elevation, partially broken away and shown in section, of the machine containing the principles of this invention;

Fig. 2 is a side elevation of the forward part of the machine, as viewed from the right of Fig. 1;

Fig. 3 is a perspective view of detached elements of strip material suitable to be applied by this machine to an innersole body in making the product which the machine is equipped to produce;

Fig. 4 is a perspective view of the forepart of a complete ribbed innersole produced by the machine;

Fig. 5 is a plan view of a detail of the machine, viz., the means by which two adhesively coated strips are brought into contact and pressed against one another for making a two ply rib;

Fig. 6 is a cross section of the same part of the machine taken on line 6—6 of Fig. 5;

Fig. 7 is an elevation of the rolls by which base flanges are formed and turned out from the composite rib material to secure a sufficiently firm union between the rib and the innersole body;

Fig. 8 is a plan view of the supporting table, edge gauge, and work feeding means of the machine;

Fig. 9 is a cross section of the same taken on line 9—9 of Fig. 8, showing the feeding and pressing means in one position;

Fig. 10 is a view similar to Fig. 9 showing the feeding and pressing means in a different position;

Fig. 11 is a cross section taken on line 11—11 of Fig. 10;

Fig. 12 is a perspective view of the feeding and pressing elements;

Fig. 13 is an elevation as seen from the right of Fig. 1 of the guide by which the flanged rib strip is led into contact with the innersole body.

Like reference characters designate the same parts wherever they occur in all the figures.

The specific machine here shown for illustration is designed to bring two strips, as the strips $a$ and $b$ shown in Fig. 3, which have been adhesively coated on one side of each, into contact with one another at their adhesively coated faces, and apply such strip to an innersole body to make the product shown in Fig. 4. In this figure, $c$ represents the innersole body, $d$ represents the two ply rib produced by joining the strips $a$ and $b$ together; and $e$ and $f$ represent the base flanges which are bent over from the strips $a$ and $b$ respectively, into the same plane, and pressed against the surface of the innersole body. The latter also may be coated with adhesive, over its entire surface or on the zone to which the base flanges of the rib are applied.

The various parts of such innersole may be made of any material having sufficient strength, stiffness and toughness to serve respectively as the body of an innersole and as the stitch-receiving rib thereof. Suitable materials are leather, artificial leather, leather-board, textile fabric, reinforced or stiffened if desired with suitable impregnants; and all of the several parts (i. e., body and component strips of the rib) may be made of the same material or of selected different materials. The adhesive forming the bond between the united parts may be of any suitable character, including those heretofore known and used in the manufacture of shoes and parts thereof, or any which may hereafter be discovered to be suitable.

The operating parts of the machine are mounted on and in a supporting framework consisting of a base 1, a rear upright 2, a forwardly extending arm 3 overhanging the base, and upright 4, 4 on the forward end of the base, to the upper extremities of which a table 5 is secured. An edge gauge 6 is mounted on the table for engagement with the edge of the innersole body $c$ to determine the distance from such edge at which the rib strip shall be placed. Said gauge is here provided as a roller connected by a pivot stud with an arm 8 which is secured to a block 9 resting on the table. Adjustment of the gauge to front or rear is provided for by means of such well known character that illustration thereof here would be superfluous.

A combined guide for the rib and support for the edge portion of the innersole is secured to the table in the forward extension thereof. This guide is designated as a whole by the numeral 10 and its attaching means consists of a lug 11 which extends under the table and is connected thereto by bolts 12. The combined guide and support is constructed as a block (of which the lug 11 is preferably an integral part) having a central groove 13 (Figs. 11 and 12) sufficiently deep to receive the rib and of proper width and inclination to locate the rib at the prescribed inclination to the plane of the innersole body. A channel 14 to receive the base flanges of the rib is formed in the top of the guide block and is beveled downwardly with a convex curvature 15 at the side into which the rib enters. Notches 16, extending from top to bottom, are provided in the side of the guide block from which the rib emerges, to accommodate the feeding and pressing instruments. A cover plate 17 is secured to the block across the entering portion of the channel to prevent premature contact between the rib and body as they approach one another, and terminates in a beveled edge near the point at which contact between the rib and body is designed to occur.

A pressure abutment 18 overlies the guide 10. It is secured to a presser bar 19 which is movable endwise in vertically alined guides on the forward end of the overhanging arm 3, and is pressed downward by a leaf spring 20.

The strips which form the rib are led to the machine from separate holders or containers, not shown. They pass respectively through converging channels (shown dotted in Fig. 5) in a guide bar 21 and thence between press rolls 22 and 23. The guide bar 21 and press roll 22 are mounted on a plate 24 which in turn is mounted on the machine base by a support 25. The complemental press roll 23 is carried by an arm 26 pivoted to the plate 24 by a pivot stud 27. A spring 28, which reacts against an abutment 29 adjustably secured to the plate, bears on arm 26 so as to press the roll 23 against roll 22. These rolls constitute the rib forming instruments of the machine.

The composite rib strip then passes between flange turning rolls 30 and 31 rotatably mounted on parallel pivot studs 32 and 33 respectively in a bracket 34 which is attached to the side of the adjacent upright 4. Roll 30 contains a deep groove 35 to receive so much of the composite strip as forms the rib proper, and roll 34 has an encircling shallow rib 36 of V formation in the same plane with the groove 35 to assist in locating definitely the position of the junctions between the rib proper and the flanges. The present machine is designed to lay the rib at an inclination to the surface of the sole, and to that end the rolls are of conical formation, making an acute angle with the plane of the groove 34 at the side of the groove where the inner flange f of the rib is formed. The surface of roll 31 at the opposite side of this plane makes an obtuse angle to said plane. The corresponding part of roll 30 may, if desired, be of complemental inclination but this not necessary, and it is not shown, inasmuch as the flange e is not sharply bent. It is to be understood that the rolls may be cylindrical, or approximately so, if the rib is to be perpendicular to the sole; or that they may be of other conical inclination than that illustrated. For applying the inclined rib, the groove 13 in the rib guide 10 is suitably inclined to the plane in which the body of the innersole is supported, as shown by Fig. 11.

The flanges of the rib are pressed against the surface of the innersole body from beneath, and the body and rib are fed in unison by means which I will now describe. The pressing instruments are rods 37, 37, having L shaped ends 38 adapted to press upwardly against the flanges e and f at opposite sides of the rib. They are mounted in a block 39 secured to the upper end of a bar 40 which is mounted in an upright position, to reciprocate endwise, in a holder or carrier 41. The feeding instruments are pointed pins or rods 42, 42, secured in a block 43 which is mounted on the upper end of a bar 44 parallel to the bar 40 and also reciprocatable endwise in the holder 41. These feeder bars are adapted to pass across and close to the extermities of the L shaped presser member 38. They are supported by buttresses 45 against deflection by the resistance of the material being fed, such buttresses being mounted in a rigid angular arm 46 rigidly secured to one side of the block 39 which carries the presser instruments.

The bars 40 and 44 are reciprocated, and the holder 41 is oscillated from side to side, by a main shaft 47 in the overhanging arm of the machine, and intermediate mechanism. On the shaft are two eccentrics, one of which is shown at 48 and the other is like unto it. These eccentrics are coupled by eccentric rods 49, 50, and rock arms, with shafts 51 and 52, respectively, in the base. Shaft 51 is connected by an arm 53 and link 54 with the bar 40; and shaft 52 is similarly connected by an arm 55 and link 56 with bar 44. Holder 41 is secured to a rock shaft 57 to which is connected also an arm 58 having a fork 59 on its upper end which embraces an eccentric 60 on shaft 47. The rock shafts 51, 52 and 57 extend from front to rear in the machine base, while the eccentric rods 49, 50 and rock arm 58 rise through the column at the rear of the machine frame.

It will be understood that in the operation of the machine the shaft 47 is constantly rotated by suitable means of well known character, such as a pulley and belt, not necessary to be shown herein. The eccentrics and cams are suitably timed to cause rise and descent of the presser rods and feed pins into and out of engagement with the work, to swing the holder in the feeding direction, (i. e., laterally or transversely to the directions in which the pressers and feed pins reciprocate), while the pressers and pins are engaged with the work, and to return the holder to starting position when the pressers and pins are withdrawn. The notches 16 in guide block 10 have sufficient extent to permit these movements of the pressing and feeding instruments.

Before putting the machine in operation the rib material is first drawn through the collecting press rolls, flange turning rolls, and guide block somewhat past the feeding pins. Then the innersole body or blank is placed on the guide block and under the abutment 18, with its edge in contact with the edge gauge 6, the abutment being then lifted (as by the lug 61 shown in Fig. 1) if necessary to permit introduction of the sole. Thereafter the machine automatically feeds the material while the operator holds it so as to maintain engagement with the edge gauge, and by the feeding action the rib is dragged through the collecting and flange turning rolls. When a sufficient length of the strip material has been laid and pressed against the body to form a complete rib, the strip is cut off by the operator near the presser rods so as to leave enough length projecting from the guide 10 for feeding purposes.

The presser rods 37 are operated positively and are opposed in their action against the sole by the spring loaded abutment. Preferably they are adjusted so as to utilize the full strength of the loading spring 20 in applying pressure. Thus the spring is the ultimate measure of the force with which the adhesive surfaces of the rib flanges and innersole body are pressed together. It may be made of a strength to give any desired pressure; and springs having different degrees of strength may be substituted for one another. By acting simultaneously on the flanges at opposite sides of the rib, the pressers effect a firm bond between the rib and body.

Beyond the point at which the pressers act is a supporting arm 62 which is secured to the table 5, as shown in Fig. 8, and extends under the attached rib, as shown in Figs. 1, 9 and 10, to prevent the sole from sagging away from the abutment above the pressers. This arm may be of resilient material and construction, although not necessarily so.

What I claim and desire to secure by Letters Patent is:

1. A machine for producing innersoles for welt shoes comprising separate guiding elements for the body of an innersole and for strip material adapted to provide the stitch receiving rib of the finished product, and associated feeding and pressing instrumentalities additional to said guiding elements arranged to propel the sole and strip material in unison while applying bonding pressure between contiguous, adhesively coated, surfaces thereof.

2. A machine for producing innersoles of the type set forth, comprising means for forming strip material into a rib with outwardly turned flanges, guiding means for locating an innersole in surface contact with such flanges, and means additional to said forming and guiding means for pressing said flanges forcibly into contact with the innersole body and feeding the composite article forwardly.

3. A machine for producing innersoles of the type dscribed, comprising a support for the body of an innersole, a guide for a rib strip having an outwardly turned base flange, said guide being arranged to lead such strip to said body with the flange of the strip in surface contact with the body, and intermittently acting feeding and pressing means additional to said support and guide organized to press said flange forcibly against the body and feed both forwardly.

4. A machine for producing innersoles of the type described, comprising means for guiding an innersole body and a flanged rib strip into surface contact with each other, a yieldingly loaded presser arranged to bear on the opposite surface of the innersole to that where the flanged strip is applied, and means organized to press the flange of said strip against the innersole body in opposition to the resistance offered by said yielding presser.

5. A machine for producing innersoles comprising guiding means for an innersole body and for a flanged rib strip arranged to bring the flange of such strip into surface contact with the body, cooperating opposed pressing means organized to act simultaneously in opposition to one another against the flange of such strip and against the opposite surface of said body, one of said pressing means being yieldingly loaded, means for positively actuating the other pressing means, and associated feeding means organized to propel the adjoined body and strip in unison.

6. A machine for producing innersoles of the type described, comprising an abutment for an innersole body, a presser arranged to move toward and away from said abutment for pressing the flange of a stitch receiving rib against one surface of an innersole body while the opposite surface of such body is restrained by the abutment, an associated intermittent feeding instrument, means for bringing said instrument into and out of connection with the associated innersole body and strip for moving it laterally in one direction while engaged with the innersole, and in the opposite direction while disengaged therefrom, and means for actuating said reciprocative presser in timed relation with the movements of said feeding instrument.

7. A machine for producing innersoles of the type described, comprising an abutment for one surface of an innersole body continuously pressed with yieldable pressure application against such surface, a presser arranged to press the flange of a stitch receiving rib against the surface of such innersole body opposite to that with which said abutment coacts, a feeding instrument, a holder by which said presser and feeding instrument are carried, means for moving said holder back and forth in directions substantially parallel to the plane of the work piece, and means for reciprocating said presser and feeding instrument toward and away from the abutment in time with the lateral movements of said holder so as to effect an intermittent feeding and pressing action upon the work.

8. A machine for applying to, and effecting adherent union between, the surface of an innersole body and the base flange of a stitch receiving rib, which comprises an abutment and a cooperating presser arranged for reception between them of such body and base flange, the abutment being continuously urged with yieldable force toward said presser, a holder in which the presser is mounted with provision for movement toward and away from the abutment, means for so moving the presser, and means for moving the holder back and forth transversely of the directions of movement of the presser, and in time with such movements so as to transport the presser laterally in one direction while in contact with the work and in the opposite direction while withdrawn from the work.

9. A machine as set forth in claim 8 combined with a pointed feeding pin also carried by said holder and movable therein so as to penetrate and withdraw from the work, and means for reciprocating said feeding pin in substantially the same directions and at substantially the same times with the presser.

10. In a machine as and for the purposes set forth, a holder, bars reciprocatively mounted in said holder, a presser instrument secured to one of said bars, a pointed feeder instrument secured to the other of said bars, means for reciprocating said bars, means for moving the holder back and forth transversely to the direction of reciprocation of the bars, and a support for the feeding instrument carried by the bar to which the presser is secured, arranged to brace the feeding instrument against deflection opposite to its transverse displacement in feeding.

11. A machine for applying a flanged rib strip to the surface of an innersole body, comprising a guide for leading such a strip in a prescribed path and having spaces to receive oppositely directed base flanges of the rib in one plane, a presser and a feeding instrument located at each side of the rib in position to engage both flanges upon emergence from the guide; a complemental abutment overlying said pressures and feeding instruments, means for moving said pressers and feeding instruments toward and away from said abutment, and means for moving the pressers and feeding instruments back and forth transversely to their previously named movements.

12. A machine for forming and applying a flanged rib strip to an innersole body, comprising flange turning instruments formed to receive a two ply rib strip and bend edge portions of both plies outwardly from one another, complemental guiding means for locating an innersole body and the outwardly turned flanges of such rib strip in surface contact with one another, and cooperating pressing means organized to force the flanges of the rib and the innersole body firmly together at opposite sides of the rib.

13. An innersole making machine comprising guiding and supporting means for an innersole body, means for pressing together adhesively coated plies of strip material on a zone extending from one edge across less than the whole width of the strips to form a rib, means for spreading apart such plies adjacent the opposite edge of the strip to form outturned base flanges, and means for pressing such base flanges into contact with a surface of the innersole body, and feeding the adjoined body and flanges forward in unison.

14. An innersole making machine comprising guiding and supporting means for an innersole body, means for pressing together adhesively coated plies of strip material to form a rib, means for spreading apart such plies adjacent to one edge of the strip to form outturned base flanges, and means for pressing such base flanges into contact with a surface of the innersole body, and feeding the adjoined body and flanges forward in unison, said strip pressing and flange turning means being located for engagement with the strip material in sequence so that the propulsion of the sole draws the strip material through them.

15. A machine for applying a reinforced stitching rib to an innersole comprising pressing rolls between which a rib strip and a reinforcing strip, adhesively coated at their adjacent sides, are passed, said rolls being organized to grip and press said strips between them throughout a part only of the width of the strips from one edge, a pair of rolls in position to receive the strip between them and shaped cooperatively to bend away from one another the marginal portions of the strips opposite to those portions pressed together by the first rolls; guiding means for leading the reinforced strip and an innersole blank together with the spread apart margins of the strip in contact with one face of the innersole blank; and means for progressively pressing the outturned margins of the strip and innersole together and simultaneously feeding them onward; said rolls and pressing means being arranged in sequence, in the order hereinbefore named, along the path of the strip.

JESSE V. POOLE.